UNITED STATES PATENT OFFICE.

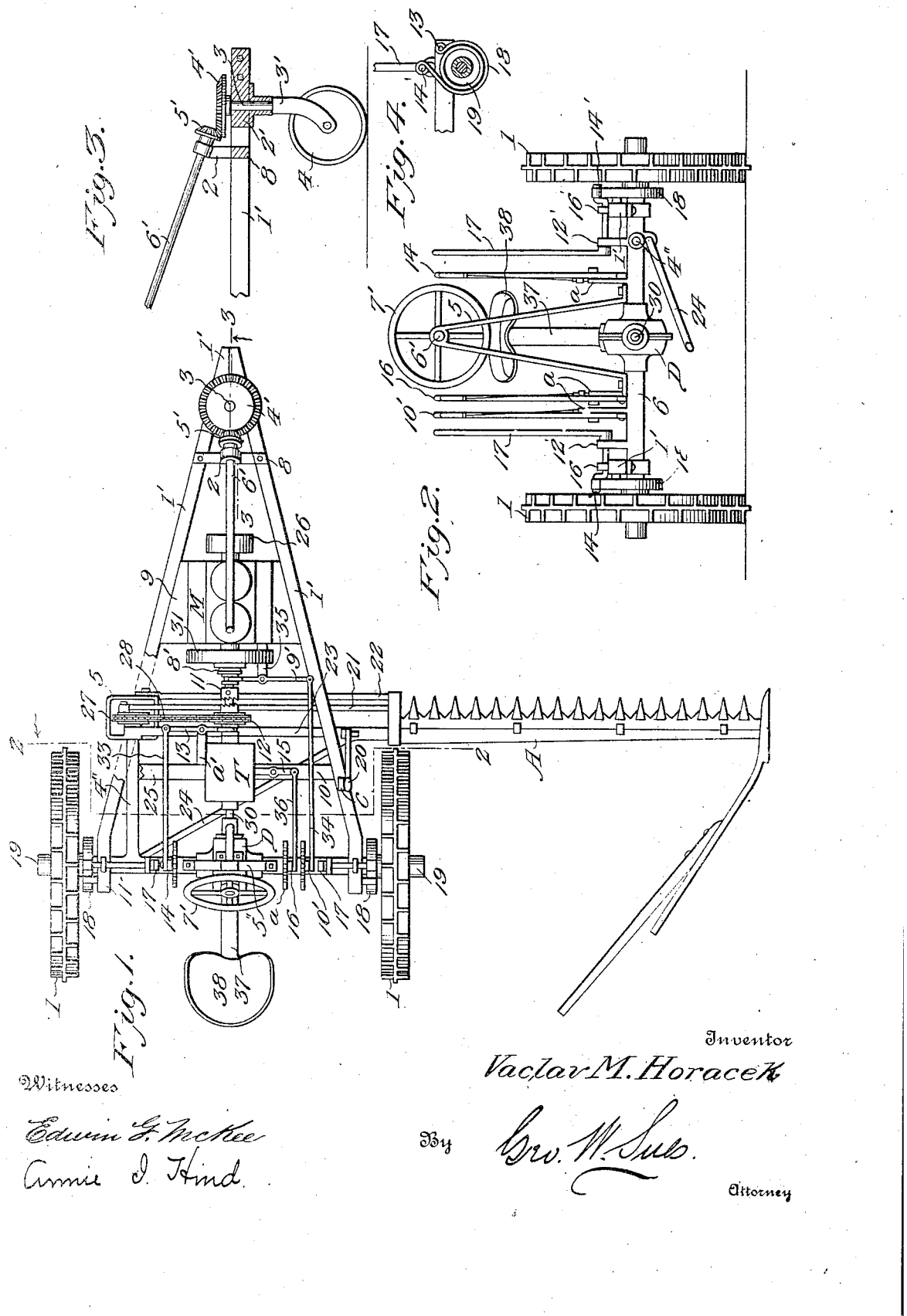

VACLAV M. HORACEK, OF TABOR, SOUTH DAKOTA.

MOWER-TRACTOR.

1,198,444.

Specification of Letters Patent. 	Patented Sept. 19, 1916.

Application filed December 21, 1911. Serial No. 667,132.

*To all whom it may concern:*

Be it known that I, VACLAV M. HORACEK, a citizen of the United States, and a resident of Tabor, in the county of Bonhomme and State of South Dakota, have invented certain new and useful Improvements in Mower-Tractors, of which the following is a specification, reference being had to the accompanying drawings.

This invention has relation to certain new and useful improvements in farm tractors employed in connection with agricultural machinery and comprises a tractor having a removable mowing attachment driven by the power of the tractor; and the primary object of my invention is to provide a three wheeled tractor of this general character of a simple and inexpensive nature and of a compact and durable construction arranged so that the mower can be readily detached permitting the tractor being used in operating auxiliary machinery, the construction being such that the tractor will turn square corners.

With these and other objects in view the present invention consists in the combination and arrangement of parts as will be hereinafter more fully described and finally pointed out in the appended claims, it being further understood that changes in the specific structure shown and described may be made within the scope of the claims without departing from the spirit of the invention.

In the accompanying drawings forming a part of this specification and in which like numerals of reference indicate similar parts in the several views: Figure 1 shows a top view of a tractor mower embodying my invention with parts broken away. Fig. 2 is an end view on line 22 of Fig. 1. Fig. 3 shows a side elevational view partly in section of the steering caster. Fig. 4 shows an enlarged detached detail of one of the hub brakes as used in my invention.

In my present invention I aim to provide a light simply constructed farm tractor especially arranged to receive a mowing attachment which is detachably secured to the tractor so that while not used in operating the mower the tractor can be used in drawing other light farm implements such as hay rakes, drags, cultivators and the like.

In the accompanying drawings the numerals 1', 1' designate two divergently held frame bars as used in my invention. At the forward end of the frame I provide a bearing head 2' arranged to receive the stem 3 of the caster fork 3', this caster fork 3' giving support to the caster 4. The upper end of the stem 3 is secured to the fork bevel gear 4' arranged to mesh with the steering bevel pinion 5', this pinion being secured to the lower end of the obliquely held steering shaft 6' which at its upper end is revolubly held within the bracket 5, shown in Figs. 1 and 2. This bracket at its lower end is bolted to the axle casing 6. At its upper end the shaft 6' is provided with the steering wheel 7'.

The divergently held frame bars 1', 1' are strengthened by means of the cross bars 8, the platform 9 and the rear brace bar 10 shown in Fig. 1. At their ends these frame bars end in the axle bearings 11', 11'. As shown this axle casing 6 is provided with the upstanding ears 12'.

Held upon suitable axles revolving within the casing 6, are the tractor wheels 1, 1. The axles of the wheels 1 are in connection with a differential gear of any approved construction, including two forward speeds, one reverse and an out of gear. In the drawings the housing D is merely shown which incloses the differential gearing.

From the foregoing it will be seen that I provide an approximately triangle carriage frame which in front is supported by means of a caster wheel and at the rear is given support by means of two traction wheels.

Engaging each wheel hub 19, as will be understood in referring to Fig. 4, is a brake band 18, one end being held upon a pin 13', while the opposite end of the band is secured to the crank 14' of a brake lever 17, thus it will be seen that with each wheel having an independent rotatable movement to the other through the differential gearing heretofore described and being provided with distinct braking means which are also independent in operation, that the entire tractor can be steered regardless of its principal steering mechanism by simply retarding the rotation of either wheel. As shown in Fig. 2 the cranks of these brake levers are held within the ears 12' and 16'.

As shown in Fig. 1 the axle casing 6 is provided with an arm 4'', ending in the gear housing 5'' and held within this arm 4'' is a shaft carrying a chain sprocket 27, from which also extends a pitman 21 secured to the sickle bar A. This construction forms a part of the mowing mechanism the sickle bar being further secured to the gear housing 5'' by means of the brace bar 22 shown in Fig. 1 and the brace bar 24 and base bar 23. By this means the sickle bar is firmly connected to the tractor frame.

Secured to one of the side frame bars 1' is the lever 20, employed to raise and lower the sickle bar, this being secured to a suitable bearing c.

Held to the platform 9 is the motor M, of any approved construction, from which extends a main driving shaft 30. This driving shaft as shown in Fig. 1, is provided with what may be termed a transmission gear of any approved type, said gear, however, not being shown. In Fig. 1 the boxing containing the transmission gear, is marked T. Held upon this main driving shaft 30 is the fly wheel 31 while at the outer end I provide the belt pulley 26. This belt pulley 26 is arranged to receive a suitable belt, when the mower is employed to drive any auxiliary machinery such as a corn sheller. Working in connection with the fly wheel 31, is the friction clutch 8', this clutch being operated by means of a collar arm 9', which strides the friction clutch 8' and is employed to connect the driving shaft 30 to the fly wheel, this friction clutch 8' being splined to the shaft. The collar arm 9' is pivotally secured to the arm 35, as shown in Fig. 1. Fixed to the driving shaft 30, adjacent to the friction clutch 8' is a ratchet collar 11, this collar being arranged to be engaged by the ratchet faced chain gear 12. This chain gear 12 is actuated by means of the arm 13 from which extends a connecting rod 33, secured to the chain gear lever 14. The arm 13 is secured to an arm a' extending from the cross brace 10, this construction being shown in Fig. 1.

Passing over the ratchet faced chain gear 12 and the chain sprocket 27 is the chain 28. The shaft 30 being in operation it is only necessary to throw the chain gear 12 into mesh with the ratchet collar 11, in order to operate the sickle bar. In order to throw the main driving shaft 30 into gear, the operator actuates a friction clutch lever 10', which by means of the rod 34, is connected to the arm 9'. This friction clutch lever is provided with a notched sector a, of usual construction and is provided with a detent so that the lever may be held in locked position as is usual in implement construction.

Extending from the transmission gearing, is a pivoted arm 15, which by means of the connecting rod 36, is secured to the transmission lever 16, this lever also being provided with a suitable notched sector a.

Extending from the differential housing D, is the seat post 37 carrying the seat 38. In referring to Fig. 1 it will be seen that the steering wheel 7' as well as the levers 14, 17, 10' and 16 are located immediately in front of and within convenient reach of said seat.

The operation of my device is very simple. The motor being started should it be desired to start the tractor, the operator actuates the friction clutch lever 10' to connect the driving shaft to the engine. This results in the differential operating the connected axles. In turning at right angles the operator throws into play one of the brake bands 18, while reversing the opposite wheel. In doing this the operator liberates the caster wheel 4, so that this wheel will freely swing in obedience to the operating traction wheel. Through this means absolutely square corners may be turned or the operator may make the machine pass in a circular path, in steering the front caster wheel 4.

In order to bring the sickle into operation the chain gear lever 14, is actuated, to throw the chain gear into mesh with the ratchet collar 11.

An important feature of my invention lies in the fact that tractor wheels are not employed to actuate the mowing mechanism, so that the slipping of the tractor wheels in no way interferes with the operation of the mower. From this it will be understood that the engine of the tractor not only propels the tractor but operates the mowing mechanism. There is a special advantage in this arrangement in that, in drawing the mower through heavy grain, no choking of the mower will result as the speed of the tractor may be diminished, while the mowing machinery operates at maximum speed. This insures the grain being properly harvested with no danger of the machine becoming chocked. This construction also eliminates any stalling of the mower as is the case where the mower is actuated by the bull wheels.

As mowers are used but a very short time during each year I have arranged the sickle bar and its operating mechanism so that the same may be easily detached from the tractor frame. The tractor can then be used as a traction engine.

An auto-mower constructed according to my invention is durable and efficient in operation, the tractor being adapted to be used in driving auxiliary machinery when the pulley 26 is provided with a driving belt.

Having thus described my said invention, what I claim as new and desire to secure by United States Letters Patent is:

1. In a mowing tractor, the combination with a frame, a bearing head at the front end thereof, caster supporting forks journaled in said bearing head, a bevel gear secured to the trunnion of said forks above said bearing head, a caster journaled in said forks, a bevel pinion meshing with said bevel gear, a main steering shaft secured to said bevel pinion, independently rotatable traction wheels secured to said frame adjacent the rear ends thereof, a motor carried by said frame, power transmitting means connecting said motor with said traction wheels and supplemental steering means carried by said frame and traction wheels.

2. In a mowing tractor, the combination with a frame, a motor carried thereby, traction wheels having independent rotation to one another, power transmitting means connecting said traction wheels to said motor, a brake band independently operative on the hub of each traction wheel, and means controlling the manipulation of said brake bands.

In testimony whereof I affix my signature, in presence of two witnesses.

VACLAV M. HORACEK.

Witnesses:
    GEORGE W. SUES,
    ANNIE I. HIND.